United States Patent
Feng et al.

(10) Patent No.: US 8,252,069 B2
(45) Date of Patent: *Aug. 28, 2012

(54) CATHODE OF LITHIUM BATTERY AND METHOD FOR FABRICATING THE SAME

(75) Inventors: Chen Feng, Bei-Jing (CN); Kai-Li Jiang, Bei-Jing (CN); Liang Liu, Bei-Jing (CN); Xiao-Bo Zhang, Bei-Jing (CN); Shou-Shan Fan, Bei-Jing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 831 days.

This patent is subject to a terminal disclaimer.

(21) Appl. No.: 12/080,717

(22) Filed: Apr. 4, 2008

(65) Prior Publication Data

US 2010/0323246 A1    Dec. 23, 2010

(30) Foreign Application Priority Data

Oct. 26, 2007    (CN) .......................... 2007 1 0124165

(51) Int. Cl.
*H01M 4/583* (2010.01)
*H01M 4/587* (2010.01)
*B05D 5/12* (2006.01)

(52) U.S. Cl. .................. 29/623.5; 429/231.8; 977/842

(58) Field of Classification Search ................ 29/623.5; 429/231.8; 977/842
See application file for complete search history.

(56) References Cited

U.S. PATENT DOCUMENTS

| | | | |
|---|---|---|---|
| 4,562,511 A * | 12/1985 | Nishino et al. ................ 361/324 |
| 6,616,495 B1 | 9/2003 | Tsuboi |
| 7,189,476 B1 | 3/2007 | Macklin et al. |
| 7,704,480 B2 | 4/2010 | Jiang et al. |
| 2002/0071913 A1* | 6/2002 | Jen ................................. 427/299 |
| 2003/0129497 A1 | 7/2003 | Yamamoto et al. |
| 2004/0241532 A1 | 12/2004 | Kim |
| 2005/0008934 A1 | 1/2005 | Oyama et al. |
| 2006/0261134 A1 | 11/2006 | Ho |
| 2007/0163702 A1 | 7/2007 | Sullivan |

(Continued)

FOREIGN PATENT DOCUMENTS

CN    1475437 A    2/2004

(Continued)

OTHER PUBLICATIONS

Zhang et al. "Spinning and Processing Continuous Yarns from 4-Inch Wafer Scale Super Aligned Carbon Nanotube Arrays", Advanced Materials, 2006, pp. 1505-1510.*

(Continued)

*Primary Examiner* — Gregg Cantelmo
(74) *Attorney, Agent, or Firm* — Altis Law Group, Inc.

(57) ABSTRACT

A cathode of a lithium battery includes a composite film. The composite film includes a carbon nanotube film structure and a plurality of active material particles dispersed therein. A method for fabricating the cathode of the lithium battery includes the steps of (a) providing an array of carbon nanotubes; (b) pulling out, by using a tool, at least two carbon nanotube films from the array of carbon nanotubes to form a carbon nanotube film structure; and (c) providing a plurality of active material particles, dispersing the active material particles in the carbon nanotube structure to form a composite film, and thereby, achieving the cathode of the lithium battery.

16 Claims, 4 Drawing Sheets

U.S. PATENT DOCUMENTS

| | | |
|---|---|---|
| 2007/0204457 A1 | 9/2007 | Sato et al. |
| 2007/0237952 A1 | 10/2007 | Jiang et al. |
| 2008/0292835 A1 | 11/2008 | Pan et al. |
| 2008/0299460 A1* | 12/2008 | Feng et al. ............ 429/231.8 |
| 2009/0272935 A1 | 11/2009 | Hata et al. |

FOREIGN PATENT DOCUMENTS

| | | |
|---|---|---|
| CN | 1485940 A | 3/2004 |
| JP | 07014582 A * | 1/1995 |
| JP | H07-14582 | 1/1995 |
| TW | 518786 | 1/2003 |
| TW | 558850 | 10/2003 |
| TW | I238555 | 1/2005 |
| TW | 200524201 | 7/2005 |
| TW | 200640564 | 12/2006 |
| TW | 200722368 | 6/2007 |
| TW | 200724486 | 7/2007 |
| WO | WO 2007015710 A2 * | 2/2007 |
| WO | WO2007078005 A1 | 7/2007 |

OTHER PUBLICATIONS

Niu et al., High power electrochemical capacitors based on carbon nanotube electrodes, Appl. Phys. Lett. 70(11), Mar. 17, 1997, pp. 1480-1482.

Wu et al., "Transparent, Conductive Carbon nanotube Films", Science, vol. 305, p. 1273-1276, 2004.

Zhang et al., "Spinning and Processing Continuous Yarns from 4-inch Wafer Scale Super Aligned Carbon Nanotube Arrays", Advance material, vol. 18, p. 1505-1510, 2006.

\* cited by examiner

CATHODE OF LITHIUM BATTERY AND METHOD FOR FABRICATING THE SAME

RELATED APPLICATIONS

This application is related to commonly-assigned application Ser. No. 12/080,714, entitled, "ANODE OF A LITHIUM BATTERY AND METHOD FOR FABRICATING THE SAME", filed on Apr. 4, 2008. Disclosure of the above-identified application is incorporated herein by reference.

BACKGROUND

1. Field of the Invention

The present invention relates to cathodes of lithium batteries and methods for fabricating the same and, particularly, to a carbon-nanotube-based cathode of a lithium battery and a method for fabricating the same.

2. Discussion of Related Art

In recent years, lithium batteries have received a great deal of attention.

Lithium batteries are used in various portable devices, such as notebook PCs, mobile phones, and digital cameras because of their small weight, high discharge voltage, long cyclic life, and high energy density compared with conventional lead storage batteries, nickel-cadmium batteries, nickel-hydrogen batteries, and nickel-zinc batteries.

A cathode of a lithium battery should have such properties as high energy density; high open-circuit voltage versus metallic lithium electrode; high capacity retention; good performance in common electrolytes; high density; good stability during charge and discharge processes, and low cost. Among various active materials, transition metal oxides and mixed transition metal oxides have received much attention owing to their relatively high charge/discharge capacities in the lithium batteries. At present, the most widely used cathode active materials are spinel type lithium manganese oxide (e.g. $LiMn_2O_4$), olivine type lithium iron phosphate (e.g. $LiFePO_4$), and layered type lithium cobalt oxide (e.g. $LiCoO_2$).

However, the low conductivity of the active materials generally induces a relatively large resistance in the cathode. As such, the charge/discharge depth of the lithium battery is relatively low. To decrease the resistance of the cathode, a conducting additive is commonly mixed with the active material. The weight of the conducting additive can reach to about 15%~30% of the total weight of the cathode. If the conducting additive is increased and the weight of the battery must remain the same, the amount of active material in the cathode must be reduced, and thus, the energy density of the lithium battery will suffer.

To solve the above-described problem, carbon nanotubes as a novel conducting additive has been tested in cathodes of lithium batteries to take advantage of the excellent conductive properties thereof. In prior art, carbon nanotube powder is mixed with the active material by ultrasonically agitating. Unfortunately, carbon nanotubes are prone to aggregation due to the extremely large specific surface area thereof, and as such, aggregated carbon nanotubes will not improve the conductivity of the cathode.

What is needed, therefore, is to provide a cathode of a lithium battery and a method for fabricating the same, in which the above problems are eliminated or at least alleviated.

SUMMARY

In one embodiment, a cathode of a lithium battery includes a composite film. The composite film includes a carbon nanotube film structure and a plurality of active material particles dispersed therein.

Advantages and novel features of the present carbon-nanotube-based cathode of the lithium battery and the related method for fabricating the same will become apparent from the following detailed description of preferred embodiments when taken in conjunction with the accompanying drawings.

BRIEF DESCRIPTION OF THE DRAWINGS

Many aspects of the present carbon-nanotube-based cathode of the lithium battery and the related method for fabricating the same can be better understood with reference to the following drawings. The components in the drawings are not necessarily to scale, the emphasis instead being placed upon clearly illustrating the principles of the present carbon-nanotube-based cathode of lithium battery and the related method for fabricating the same.

Figure 1:
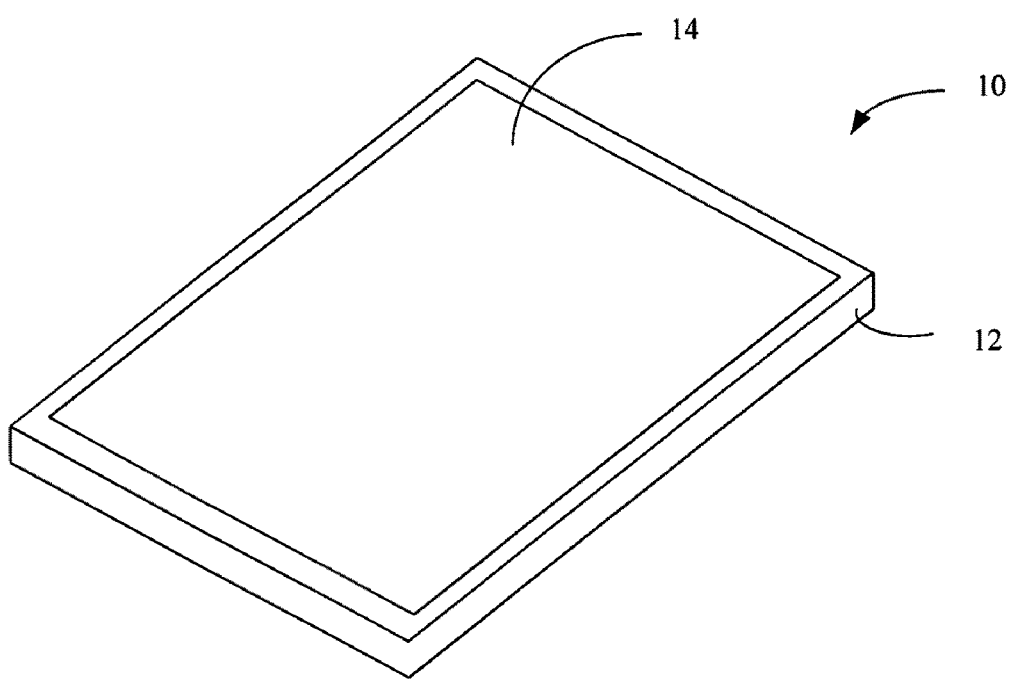
FIG. 1 is a schematic view of a cathode of a lithium battery, in accordance with a present embodiment.

Corresponding reference characters indicate corresponding parts throughout the several views. The exemplifications set out herein illustrate at least one preferred embodiment of the present carbon-nanotube-based cathode of the lithium battery and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present carbon-nanotube-based cathode of the lithium battery and the related method for fabricating the same.

Figure 2:
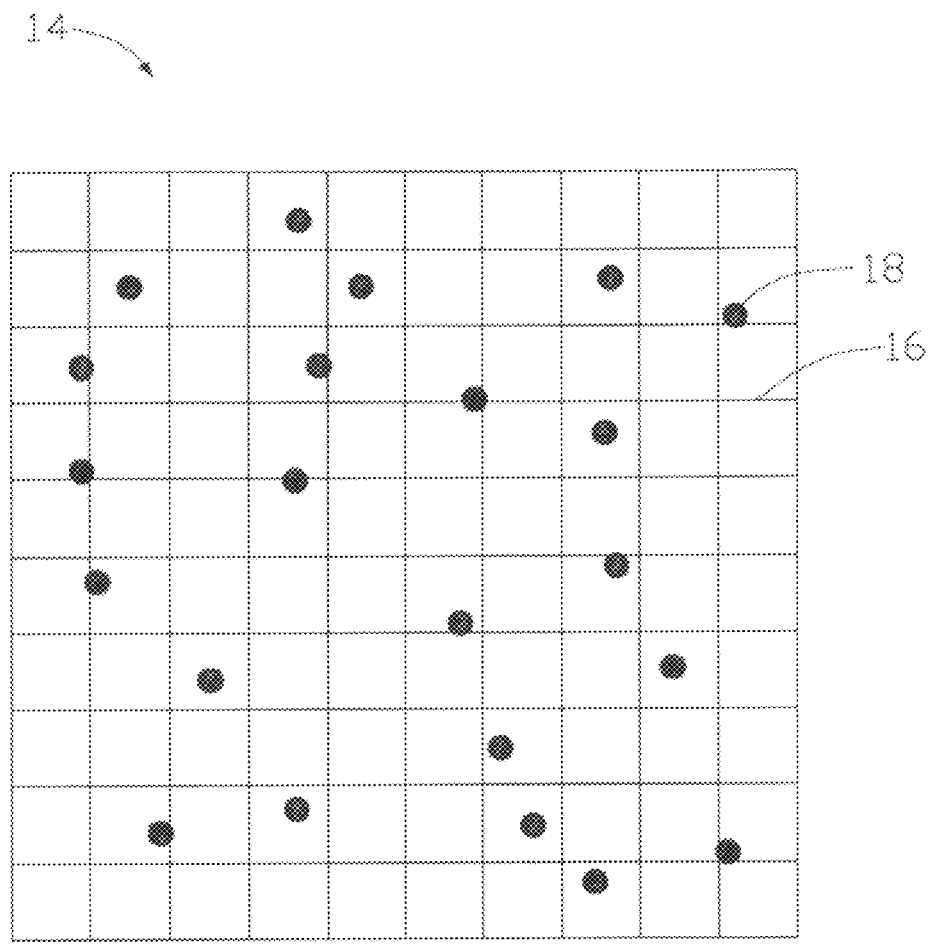
FIG. 2 is a schematic view of a composite film used in the cathode of the lithium battery of FIG. 1.

Referring to FIG. 1 and FIG. 2, a cathode 10 in the present embodiment includes a current collector 12 and a composite film 14 disposed on the current collector 12. The current collector 12 can, beneficially, be a metal substrate. Quite suitably, the metal substrate is a copper sheet. The composite film 14 includes a carbon nanotube film structure 16 and a plurality of active material particles 18 dispersed in the carbon nanotube film structure 16.

The carbon nanotube film structure 16 includes at least two overlapped carbon nanotube films. Each carbon nanotube film includes a plurality of successive carbon nanotube bundles joined end to end and are aligned in the same direction. The at least two carbon nanotube films cross and overlap with each other. The number of the carbon nanotube films and the angle between the aligned directions of the two adjacent carbon nanotube films is arbitrarily set.

In the present embodiment, a width of the carbon nanotube film structure 16 can, suitably, be in the approximate range from 1 centimeter to 10 centimeters, and a thickness of the carbon nanotube film structure 16 can, usefully, be in the approximate range from 0.01 micron to 100 microns. The carbon nanotube film structure 16 having a plurality of micropores defined by the spacing between adjacent carbon nanotube bundles. The diameter of the resulting micropores can, beneficially, be less than 100 nanometers.

Figure 4:
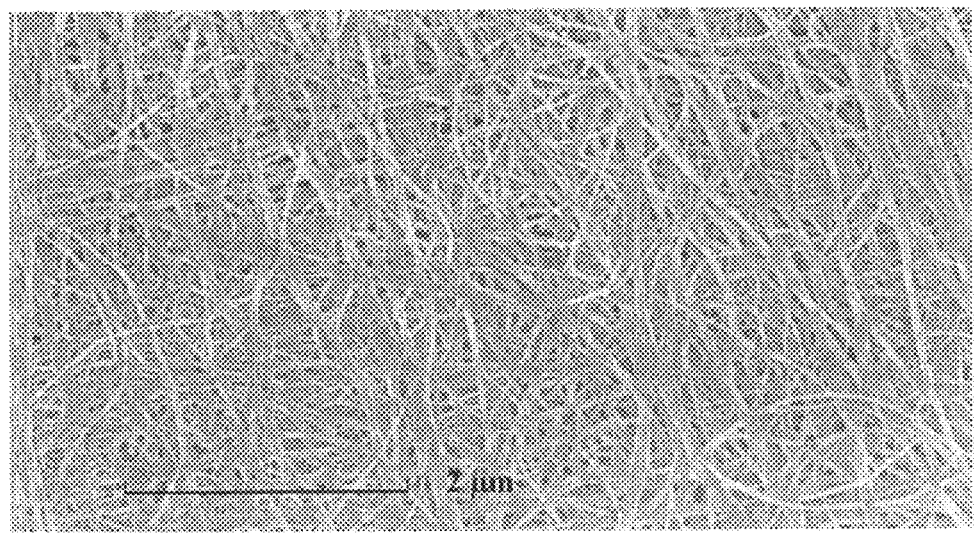
FIG. 4 shows a Scanning Electron Microscope (SEM) image of a carbon nanotube film structure, in accordance with the present embodiment.

Referring to FIG. 4, quite suitably, the carbon nanotube film structure includes 200 carbon nanotube films overlapped with each other. In the present embodiment, the width of the carbon nanotube film structure 16 is about 5 centimeters, and the thickness of the carbon nanotube film structure 16 is about 50 microns. The angle between the aligned directions of two adjacent carbon nanotube films is about 90°. The diameter of each of the micropores is about 60 nanometers.

The active material particles 18 are adsorbed to the wall of the carbon nanotubes by van der Waals attractive force or filled into the spacing between adjacent carbon nanotube bundles of the carbon nanotube structure 16. The size of the active material particles 18 can, opportunely, be nano-scale. Quite suitably, the diameter of the active material particles 18 is in the approximate range from 3 nanometers to 10 nanometers. In the present embodiment, the diameter of the active material particles 18 is about 6 nanometers.

The active material particles 18 can, opportunely, be made up of transition metal oxides and mixed transition metal oxides such as spinel type lithium manganese oxide (e.g. $LiMn_2O_4$), olivine type lithium iron phosphate (e.g. $LiFePO_4$), and layered type lithium cobalt oxide (e.g. $LiCoO_2$).

It is to be understood that, the current collector 12 in the cathode 10 of the lithium battery in the present embodiment is optional. In another embodiment, the cathode 10 of the lithium battery may only include the carbon nanotube film structure 16. Due to a plurality of carbon nanotube films being piled to form a self-sustained and stable film structure, the carbon nanotube film structure 16 can be used as the cathode 10 in the lithium battery without the current collector 12.

The carbon nanotube film structure 16 in the present embodiment has extremely large specific surface area (i.e. surface area per gram of solid material). As such, a relatively large amount of active material particles 18 can be adsorbed to the walls of the carbon nanotubes or filled into the micropores of the carbon nanotube structure 16. Accordingly, the charge/discharge capacity of the lithium battery using the above-described carbon-nanotube-based cathode can be improved. Further, because the active material particles are uniformly dispersed in the carbon nanotube film structure 16, the conductivity of the cathode can be enhanced.

Figure 3:
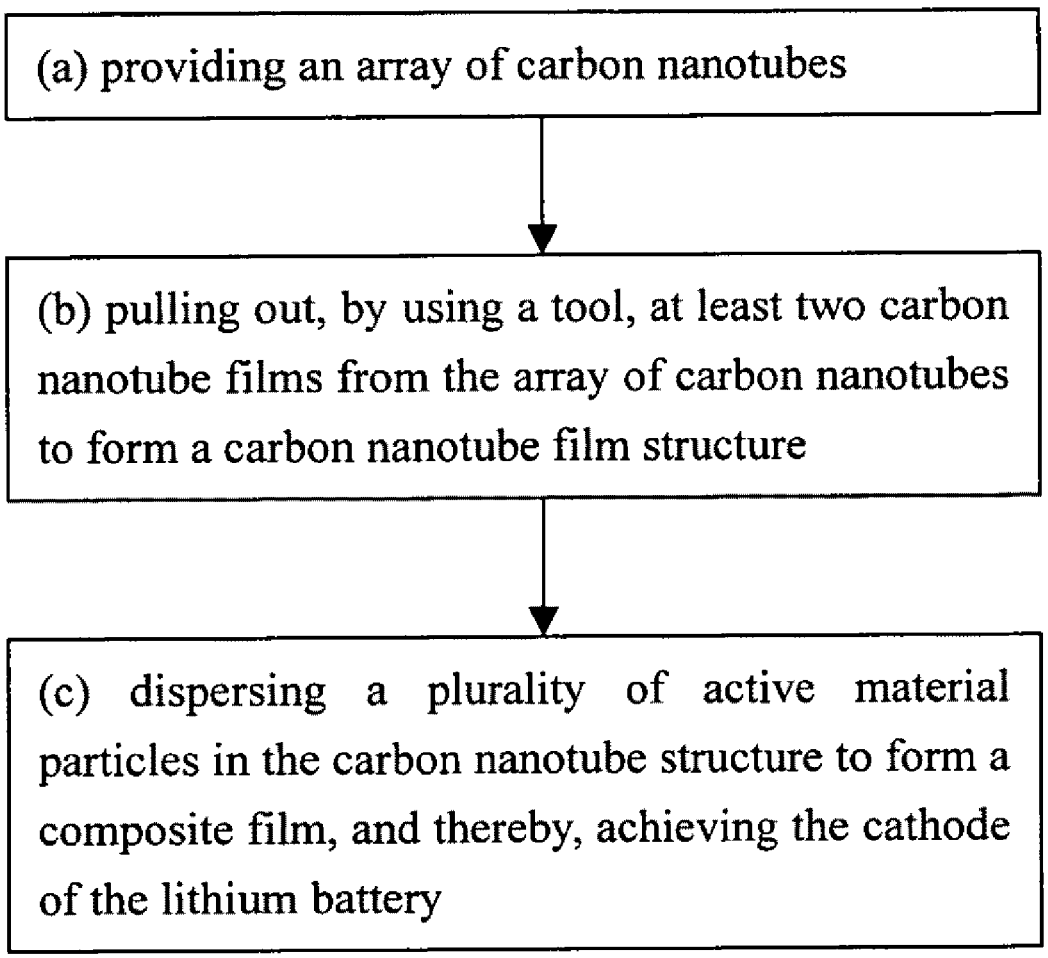
FIG. 3 is a flow chart of a method for fabricating the cathode of the lithium battery of FIG. 1.

Referring to FIG. 3, a method for fabricating the cathode 10 of the lithium battery includes the steps of: (a) providing an array of carbon nanotubes, quite suitably, providing a super-aligned array of carbon nanotubes; (b) pulling out at least two carbon nanotube films from the array of carbon nanotubes, by using a tool (e.g., adhesive tape or another tool allowing multiple carbon nanotubes to be gripped and pulled simultaneously) to form a carbon nanotube film structure 16; and (c) providing a plurality of active material particles 18, dispersing the active material particles 18 in the carbon nanotube structure 16 to form a composite film 14; (d) providing a current collector 12 and disposing the composite film 14 on the current collector 12 to achieve the cathode 10 of the lithium battery.

In step (a), a given super-aligned array of carbon nanotubes can be formed by the steps of: (a1) providing a substantially flat and smooth substrate; (a2) forming a catalyst layer on the substrate; (a3) annealing the substrate with the catalyst at a temperature in the approximate range of 700° C. to 900° C. in air for about 30 to 90 minutes; (a4) heating the substrate with the catalyst at a temperature in the approximate range from 500° C. to 740° C. in a furnace with a protective gas therein; and (a5) supplying a carbon source gas into the furnace for about 5 to 30 minutes and growing a super-aligned array of the carbon nanotubes from the substrate.

In step (a1), the substrate can, beneficially, be a P-type silicon wafer, an N-type silicon wafer, or a silicon wafer with a film of silicon dioxide thereon. Quite suitably, a 4-inch P-type silicon wafer is used as the substrate.

In step (a2), the catalyst can, advantageously, be made of iron (Fe), cobalt (Co), nickel (Ni), or any combination alloy thereof.

In step (a4), the protective gas can, beneficially, be made up of at least one of nitrogen ($N_2$), ammonia ($NH_3$), and a noble gas. In step (a5), the carbon source gas can, advantageously, be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force. The carbon nanotubes in the super-aligned array of carbon nanotubes can, beneficially, be selected from single-walled carbon nanotubes, double-walled carbon nanotubes, multi-walled carbon nanotubes, or any combination thereof.

It is to be understood that the method for providing the array of carbon nanotubes is not restricted by the above-mentioned steps, but any method (e.g. a laser vaporization method, or an arc discharge method) known in the art.

In step (b), carbon nanotube films can, beneficially, be pulled out from the super-aligned array of carbon nanotubes by the substeps of: (b1) selecting a plurality of carbon nanotube segments having a predetermined width; (b2) pulling the carbon nanotube segments at an even/uniform speed to form at least two carbon nanotube films; (b3) overlapping the at least two carbon nanotube films to form a carbon nanotube film structure 16.

In step (b1), quite usefully, the carbon nanotube segments having a predetermined width can be selected by using a wide adhesive tape as the tool to contact the super-aligned array. In step (b2) the pulling direction is, usefully, substantially perpendicular to the growing direction of the super-aligned array of carbon nanotubes.

More specifically, during the pulling process, as the initial carbon nanotube segments are drawn out, other carbon nanotube segments are also drawn out end to end, due to the van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner is able to formed to have a selectable, predetermined width.

In step (b3), after being pulled from the array of carbon nanotubes, the carbon nanotube films can, usefully, be overlapped with each other to form a carbon nanotube film structure 16. It is noted that because the carbon nanotubes in the super-aligned array in step (a) have a high purity and a high specific surface area, the carbon nanotube film is adhesive. As such, adjacent carbon nanotube films are combined by van der Waals attractive force to form a stable carbon nanotube film structure 16. The number of carbon nanotube films and the angle between the aligned directions of two adjacent carbon nanotube films may either be arbitrarily set or set according to actual needs/use. Quite usefully, in the present embodiment, the carbon nanotube structure 16 includes 200 carbon nanotube films, and the angle between the aligned directions of two adjacent carbon nanotube films can, opportunely, be about 90°.

Quite suitably, an additional step (e) of treating the carbon nanotube film structure 16 in the cathode 10 of the lithium battery with an organic solvent can, advantageously, be further provided after step (b).

In step (e), the carbon nanotube film structure 16 can, beneficially, be treated by either of two methods: dropping an organic solvent from a dropper to soak an entire surface of the carbon nanotube film structure 16 or immersing the carbon nanotube film structure 16 into a container having an organic solvent therein. The organic solvent is volatilizable and can be selected from the group consisting of ethanol, methanol, acetone, dichloroethane, chloroform, and combinations thereof. Quite suitably, the organic solvent is ethanol. After being soaked by the organic solvent, the carbon nanotube segments in the carbon nanotube film structure 16 can at least partially shrink into carbon nanotube bundles due to the surface tension created by the organic solvent. Due to the decrease of the specific surface via bundling, the coefficient of friction of the carbon nanotube film structure 16 is reduced, but the carbon nanotube film structure 16 maintains high mechanical strength and toughness. As such, the carbon nanotube film structure 16 after the treating process can be used conveniently. Further, after being treated with the organic solvent, due to the shrinking/compacting of the carbon nanotube segments into carbon nanotube bundles, the parallel carbon nanotube bundles in one layer are, relatively, distant (especially compared to the initial layout of the carbon nanotube segments) from each other and are oriented crosswise with the parallel carbon nanotube bundles of adjacent layers. As such, the carbon nanotube film structure 16 having a microporous structure can thus be formed (i.e., the micropores are defined by the spacing between adjacent bundles).

It is to be understood that the microporous structure is related to the layer number of the carbon nanotube film structure 16. The greater the number of layers that are formed in the carbon nanotube film structure 16, the greater will be the number of bundles in the carbon nanotube film structure 16. Accordingly, the spacing between adjacent bundles and the diameter of the micropores will decrease.

It will be apparent to those having ordinary skill in the field of the present invention that the size of the carbon nanotube film structure 16 is arbitrarily and depends on the actual needs of utilization (e.g. a miniature lithium battery). A laser beam can be used to cut the carbon nanotube film structure 16 into smaller size in open air.

In step (c), the composite film 14 can, advantageously, be formed by the substeps of: (c1) providing a preform or a precursor of the active material; (c2) immersing the carbon nanotube film structure 16 in the preform or the precursor of the active material to form the composite film 14.

The active material can, opportunely, be transition metal oxides and mixed transition metal oxides such as spinel type lithium manganese oxide (e.g. $LiMn_2O_4$), olivine type lithium iron phosphate (e.g. $LiFePO_4$), and layered type lithium cobalt oxide (e.g. $LiCoO_2$).

In one useful embodiment of step (c), the preform of the active material can, suitably, be a mixture of the active material and a solvent. The solvent can, beneficially, be selected from the group consisting of water, ethanol, acetone, and combinations thereof. Quite usefully, the active material can be saturated in the solvent. The carbon nanotube film structure 16 can, advantageously, be immersed in the preform of the active material for a period of time until the solvent volatilized completely. Thus, the active material particles 18 can be uniformly dispersed in the carbon nanotube film structure 18.

In another embodiment of step (c), the preform can, usefully, be the active material in gas state at elevated temperature. The carbon nanotube film structure 16 can be directly disposed in the gas of the active material for 0.5 to 2 hours in a protective gas. After cooled to room temperature, the active material particles 18 can be formed and uniformly dispersed in the carbon nanotube film structure 16. The protective gas can, beneficially, be made up of at least one of nitrogen ($N_2$), ammonia ($NH_3$), and a noble gas.

In step (c), the precursor is a mixture of at least two reactants for preparing the active material. The reactants can, opportunely, be in gas state, liquid state, or mixed with a solvent. The carbon nanotube film structure 16 can, suitably, be immersed in the precursor for a period of time. After the reaction of the reactants, the active material particles 18 can be formed and uniformly dispersed in the carbon nanotube film structure 16. It is to be understood that the impurities formed by the reaction can be eliminated by a washing/filtration step.

In the present embodiment, the preform is a saturated solution of $LiCoO_2$ in water. The carbon nanotube film structure 16 is immersed in the preform for several hours until the water dried up. Thus, in the resulted composite film 14, the $LiCoO_2$ particles are uniformly dispersed in the carbon nanotube film structure 16.

In step (d), the current collector 12 can, beneficially, be a metal substrate. Quite suitably, the metal substrate is a copper sheet.

It is to be understood that, in step (d), the current collector 12 in the cathode of the lithium battery is optional. In another embodiment, the cathode of the lithium battery may only include the composite film 14. Due to a plurality of carbon nanotube films being overlapped to form a self-sustained and stable film structure, the composite film 14 can be solely used as the cathode in the lithium battery without the current collector 12.

The cathode 10 of the present embodiment includes the carbon nanotube film structure 16 and the active material particles 18 uniformly dispersed therein. As such, the conductivity of the cathode can be enhanced. Further, the capacity of the lithium battery using the above-described cathode 10 can be improved due to the reduced resistance thereof. Additionally, the method for fabricating the above-described cathode 10 is simple and suitable for mass production.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for fabricating a cathode of a lithium battery, the method comprises the steps of:
   (a) providing an array of carbon nanotubes;
   (b) pulling out, by using a tool, at least two carbon nanotube films from the array of carbon nanotubes;
   (d) overlapping the at least two carbon nanotube films along different direction to form a carbon nanotube film structure where the carbon nanotubes are crossed with each other; and (c) providing a preform or a precursor of the cathode active material, and immersing the carbon nanotube film structure in the preform or the precursor of the cathode active material to form the composite film, and thereby, achieving the cathode of the lithium battery.

2. The method as claimed in claim 1, wherein the step (b) further comprises the substeps of:
(b1) selecting a plurality of carbon nanotube segments having a predetermined width from the array of carbon nanotubes; and
(b2) pulling the carbon nanotube segments at a uniform speed and perpendicular to the growing direction of the array of the carbon nanotubes, to form the at least two carbon nanotube films.

3. The method as claimed in claim 1, wherein a step of treating the carbon nanotube film structure with an organic solvent is further provided after step (b), and the organic solvent comprises at least one material selected from the group consisting of ethanol, methanol, acetone, dichloroethane, chloroform, and combinations thereof.

4. The method as claimed in claim 1, wherein the preform of the cathode active material is a mixture of the cathode active material and a solvent, or the cathode active material is in a gaseous state.

5. The method as claimed in claim 4, wherein the cathode active material is saturated in the solvent.

6. The method as claimed in claim 4, wherein the cathode active material in the gaseous state is cooled in protective gas to form a plurality of cathode active material particles, and the protective gas comprises at least one gas selected from the group consisting of nitrogen ($N_2$), ammonia ($NH_3$), and a noble gas.

7. The method as claimed in claim 1 further comprising a step of cutting the carbon nanotube film structure into a predetermined shape and size.

8. The method as claimed in claim 1, wherein a step (d) of providing a current collector and disposing the composite film on the current collector is further provided after step (c).

9. The method as claimed in claim 1, wherein the preform is a solution having $LiCoO_2$ particles uniformly dispersed therein.

10. The method as claimed in claim 1, wherein in step (b), an angle between aligned directions of the at least two carbon nanotube films is about 90°.

11. The method as claimed in claim 7, wherein the step of cutting the carbon nanotube film structure comprises using a laser beam.

12. The method as claimed in claim 3, wherein the step of treating the carbon nanotube film structure with the organic solvent comprises dropping the organic solvent to soak an entire surface of the carbon nanotube film structure.

13. The method as claimed in claim 3, wherein the step of treating the carbon nanotube film structure with the organic solvent comprises: immersing the carbon nanotube film structure into a container having the organic solvent therein.

14. The method as claimed in claim 1, wherein the carbon nanotube film structure comprises a plurality of micropores, the cathode active material particles are absorbed on walls of the carbon nanotubes or filled into the plurality of micropores.

15. The method as claimed in claim 1, wherein the composite film comprises a self-sustained structure.

16. The method as claimed in claim 1, further comprising a step of drying the composite film after the step (c).

* * * * *